(12) United States Patent
Oltmans et al.

(10) Patent No.: US 8,627,104 B2
(45) Date of Patent: Jan. 7, 2014

(54) SECURE DATA STORAGE

(75) Inventors: James Robert Oltmans, Evergreen, CO (US); Benjamin E. Zweber, Littleton, CO (US)

(73) Assignee: Absio Corporation, Littleton, CO (US)

( * ) Notice: Subject to any disclaimer, the term of this patent is extended or adjusted under 35 U.S.C. 154(b) by 219 days.

(21) Appl. No.: 13/096,603

(22) Filed: Apr. 28, 2011

(65) Prior Publication Data

US 2013/0031372 A1 Jan. 31, 2013

(51) Int. Cl.
H04L 29/06 (2006.01)

(52) U.S. Cl.
USPC .......................... 713/189; 707/640; 711/100

(58) Field of Classification Search
USPC .................................. 713/189; 707/640, 999.2
See application file for complete search history.

(56) References Cited

U.S. PATENT DOCUMENTS

| | | | |
|---|---|---|---|
| 4,816,653 A | | 3/1989 | Anderl et al. |
| 4,882,474 A | | 11/1989 | Anderl et al. |
| 5,032,979 A | | 7/1991 | Hecht et al. |
| 5,390,318 A | * | 2/1995 | Ramakrishnan et al. ..... 711/158 |
| 5,859,966 A | | 1/1999 | Hayman et al. |
| 5,960,086 A | | 9/1999 | Atalla |
| 5,987,517 A | | 11/1999 | Firth et al. |
| 6,064,736 A | * | 5/2000 | Davis et al. .................... 713/155 |
| 6,088,449 A | | 7/2000 | Atalla |
| 6,393,569 B1 | | 5/2002 | Orenshteyn |
| 6,453,334 B1 | | 9/2002 | Vinson et al. |
| 6,711,686 B1 | | 3/2004 | Barrett |
| 6,912,655 B1 | | 6/2005 | Zucker |
| 6,959,394 B1 | * | 10/2005 | Brickell et al. ................... 726/5 |
| 7,024,452 B1 | | 4/2006 | O'Connell, Jr. et al. |
| 7,036,020 B2 | | 4/2006 | Thibadeau |
| 7,096,253 B2 | | 8/2006 | Vinson et al. |
| 7,107,323 B2 | | 9/2006 | Hara et al. |
| 7,178,165 B2 | | 2/2007 | Abrams |
| 7,209,960 B2 | | 4/2007 | Veselov |
| 7,257,706 B1 | | 8/2007 | Zucker |
| 7,290,279 B2 | | 10/2007 | Eun et al. |
| 7,302,571 B2 | | 11/2007 | Noble et al. |
| 7,325,041 B2 | | 1/2008 | Hara et al. |
| 7,328,341 B1 | | 2/2008 | Eun et al. |
| 7,426,787 B2 | | 9/2008 | Tracy et al. |

(Continued)

FOREIGN PATENT DOCUMENTS

| | | | |
|---|---|---|---|
| WO | WO 2010/111438 | | 9/2010 |
| WO | WO2010111438 | * | 9/2010 |

OTHER PUBLICATIONS

Andrews, "The Design of the Saguaro Distributed Operating System", 1987, IEEE, p. 104-118.*

(Continued)

Primary Examiner — Morshed Mehedi
Assistant Examiner — Gregory Lane
(74) Attorney, Agent, or Firm — Sheridan Ross P.C.

(57) ABSTRACT

Methods and systems for obscuring the location of critical system files are provided. In particular, the locations of files stored within a file system are selected by applying various inputs to a hash algorithm. For system files, the inputs applied to the hash algorithm can include a user name and password. For data files, the information provided to the hash algorithm can include the file name. In addition to providing random file locations, a file system in accordance with embodiments of the present invention can homogenize other information, including file names, sizes and creation dates.

15 Claims, 9 Drawing Sheets

(56) References Cited

U.S. PATENT DOCUMENTS

| | | | |
|---|---|---|---|
| 7,461,270 B2 | 12/2008 | Thibadeau | |
| 7,587,426 B2 * | 9/2009 | Fujiwara et al. | 1/1 |
| 7,620,698 B2 | 11/2009 | Hara et al. | |
| 7,698,732 B2 | 4/2010 | Naglieri | |
| 7,716,342 B2 | 5/2010 | O'Connell, Jr. et al. | |
| 7,716,743 B2 | 5/2010 | Costea et al. | |
| 7,743,249 B1 | 6/2010 | Zucker et al. | |
| 7,765,239 B2 | 7/2010 | Rajan et al. | |
| 7,792,859 B2 | 9/2010 | Harris et al. | |
| 7,885,932 B2 * | 2/2011 | Kulkarni et al. | 707/640 |
| 2002/0169878 A1 | 11/2002 | Orenshteyn | |
| 2002/0184398 A1 | 12/2002 | Orenshteyn | |
| 2003/0005300 A1 | 1/2003 | Noble et al. | |
| 2003/0023867 A1 | 1/2003 | Thibadeau | |
| 2003/0037252 A1 | 2/2003 | Abrams | |
| 2003/0056112 A1 | 3/2003 | Vinson et al. | |
| 2003/0200436 A1 | 10/2003 | Eun et al. | |
| 2004/0060053 A1 | 3/2004 | Veselov | |
| 2004/0156501 A1 | 8/2004 | Zuili | |
| 2004/0205109 A1 | 10/2004 | Hara et al. | |
| 2005/0251806 A1 | 11/2005 | Auslander et al. | |
| 2005/0268114 A1 | 12/2005 | Thibadeau | |
| 2006/0069692 A1 | 3/2006 | Pernia | |
| 2006/0129657 A1 | 6/2006 | O'Connell, Jr. et al. | |
| 2006/0161988 A1 | 7/2006 | Costea et al. | |
| 2006/0174325 A1 | 8/2006 | Naglieri | |
| 2006/0271653 A1 | 11/2006 | Hara et al. | |
| 2006/0282440 A1 * | 12/2006 | Fletcher et al. | 707/100 |
| 2007/0011469 A1 | 1/2007 | Allison et al. | |
| 2007/0011749 A1 | 1/2007 | Allison et al. | |
| 2007/0016771 A1 | 1/2007 | Allison et al. | |
| 2007/0027873 A1 | 2/2007 | Factor et al. | |
| 2007/0083559 A1 | 4/2007 | Harris et al. | |
| 2007/0174920 A1 | 7/2007 | Thibadeau | |
| 2008/0010285 A1 | 1/2008 | Rajan et al. | |
| 2008/0027866 A1 | 1/2008 | Halcrow et al. | |
| 2008/0098086 A1 | 4/2008 | Hara et al. | |
| 2009/0049047 A1 | 2/2009 | Battepati et al. | |
| 2009/0144545 A1 | 6/2009 | Dhuvur et al. | |
| 2009/0144582 A1 | 6/2009 | Li et al. | |
| 2009/0235091 A1 | 9/2009 | Kurn et al. | |
| 2009/0276434 A1 | 11/2009 | Harris et al. | |
| 2010/0088496 A1 * | 4/2010 | Zolnowsky et al. | 712/245 |
| 2010/0205458 A1 | 8/2010 | O'Connell, Jr. et al. | |
| 2010/0333116 A1 | 12/2010 | Prahlad et al. | |
| 2012/0054315 A1 * | 3/2012 | Morrison et al. | 709/219 |

OTHER PUBLICATIONS

International Sear Report and Written Opinion for International (PCT) Patent Application No. PCT/US12/34765, mailed Apr. 8, 2013, 8 pages.

* cited by examiner

| File System | | | |
|---|---|---|---|
| 1004  Name  142 | | 1012  Size | 1016  Date |
| Root Dir | | | |
| 148 | File AA | 501 KB | 05/01/2010 |
| | File AB | 499 KB | 05/01/2010 |
| 1008a  Dir AC | | | |
| 148 | File AD | 502 KB | 05/01/2010 |
| 144 | File AE | 500 KB | 05/01/2010 |
| 1008b  Dir AF | | | |
| 148 | File AG | 500 KB | 05/01/2010 |
| 144 | File AH | 507 KB | 05/01/2010 |

SECURE DATA STORAGE

FIELD

Systems and methods for providing secure data storage are disclosed. More particularly, a file system is provided in which the locations of critical system files are obfuscated.

BACKGROUND

The security of computer and data systems is an important consideration. In order to secure data stored electronically, various techniques have been employed. For example, physical access to data can be restricted. However, physically compartmentalizing data is inconvenient, and is becoming increasingly unrealistic, as remote access to data and cloud based computing becomes the norm.

Other techniques for securing electronic data involve the use of passwords and encryption. Passwords can be required before a user is granted access to a system. Most encryption schemes operate by scrambling the data to be secured using an encryption key. Access to protected data can thus require provision of a required password, use of an appropriate algorithm, and the compliment or pair to the key that was used to encrypt the data. Depending on the password, the encryption algorithm and the length of the key, data thus protected can be quite difficult to access. However, one weakness of such systems is that, once a hacker or other unauthorized party obtains the necessary password and/or key, that party has complete access to the encrypted data. Another weakness of systems that utilize encryption keys is that when a hacker desires access to encrypted information, the hacker can initiate an attack by analyzing relatively small files, which likely comprise files containing encryption keys. In addition, the hacker can concentrate on files generated on or near the date and time of system initialization, since such files are likely to comprise system files containing or pointing to key stores. By thus limiting the volume of information on which to concentrate an attack, the security of encrypted file systems can more easily be overcome.

SUMMARY

Embodiments of the disclosed invention are directed to solving these and other problems and disadvantages of the prior art. In accordance with embodiments of the present invention, an apparently homogenous or obfuscated file system is provided. The file system utilizes random storage locations for at least some system and/or data files when those files are stored on the system. This makes it more difficult for a hacker to locate files containing information that is used to secure system data, such as files containing keys required to unlock that data or content.

In accordance with embodiments of the present invention, a client or system application implementing an obfuscated file system or structure places files created by or stored on the system in a unique hashed file location. This location is stored in a central index, which is encrypted and stored within the file system like any other file when it is not in use. Moreover, the location of the central index is not stored in any obvious or universally known location. In particular, a different hash for the location of the central index will be generated for each different user. The location of the central index can be calculated based on a combination of secret data or input and known data or input. Secret data or input can include, but is not limited to, a password. Accordingly, although password is at times used in the present disclosure to refer to secret input, embodiments of the present invention can make use of secret input in forms other than a password. Therefore, as an example, the location of a central index can be calculated based on the user name and password for a system user. As another example, the location of a central index can be calculated from input that includes a private key or other secret data or input. Accordingly, calculating the location of the central index relies on the knowledge of secret information, such as the user's password. In addition, this arrangement enables different central indices and index locations for different users and/or user name and password combinations, while maintaining security between the different users and/or user name and password combinations.

The location of the central index is determined by a hash function or algorithm that can be passed the name and password of the user, a salt, and optionally additional unique information to calculate the file location or by passing the hash function any combination of secret and known data. Having thus determined the file location, that location and password can be validated by using the password or other secret data to decrypt the file found at that location. If the decryption fails or a file is not found at the determined location, then it can be concluded that the input data was invalid. This verification removes any need to permanently store the exact password in a retrievable way or the need for system files to be stored in a standard or known location. Accordingly, a password or other secret data or input is both a critical part of the file location mechanism, and part of the key to decrypting that file.

In accordance with further embodiments of the present invention, one user can use different passwords or secret inputs for different purposes. For example, a first password or secret input can unlock the system normally. A second, different password or secret input, can be used to access and initiate a script that is executed to perform a task. An example of a task could be a background task that performs a system wipe and that sends an alarm message where the second password or secret input is set up as a duress signal. A third password or secret input could be established to unlock an alternate system content index. Therefore, different data sets can be stored concurrently in the system. Moreover, no interrelation or knowledge of the different data sets by other data sets is required. In accordance with still other embodiments, a first password or secret input may be required to access a first content index. After accessing this first content index, additional content could be accessed if a second password or secret input is provided, where the additional content is accessed through a second content index that could require both the first password/secret input and the second password/secret input in order to calculate the location and decrypt the content. This principle can be extended for n number of passwords/secret inputs. As still other examples, different algorithms and/or the addition of different salts to the secret inputs can be used to calculate different file locations. For instance, one hash salt can be used to unlock the central index while another hash salt can be used to unlock an asymmetric private encryption key at a location different than the central index, all in response to the entry of one password or secret input. In accordance with still other embodiments, device identification and other device specific information can be mixed into the hash algorithm's input to ensure that copies of the file are only accessible by a specific device or system reporting to the same device identifier.

The location of all data files can also be determined through application of a hash algorithm. More particularly, a file name and a salt can be provided to the hash algorithm. From these inputs, the hash algorithm calculates a file location for the data file. Provided the calculated location is not already occupied, the data file is stored in the calculated location.

In accordance with other embodiments of the present invention, measures may be taken to further obscure or homogenize system files. For example, the names of system and data files can be homogenized. As a further example, files may be split into multiple chunks or padded so that all files have the same or similar sizes to one another. The common file size can be a predetermined size, or a size that represents an average size or common size of the files stored on the system. Alternatively or in addition, dummy files can be generated. In accordance with still other embodiments, the files may be placed within a tree of directories and subdirectories according to the algorithm used to determine the index file location. In accordance with still other embodiments, the times and dates associated with files can be altered, either directly or through the regeneration of the files.

Additional features and advantages of embodiments of the present invention will become more readily apparent from the following description, particularly when taken together with the accompanying drawings.

BRIEF DESCRIPTION OF THE DRAWINGS

FIG. 10 illustrates an exemplary file system in accordance with embodiments of the present invention.

DETAILED DESCRIPTION

Figure 1:
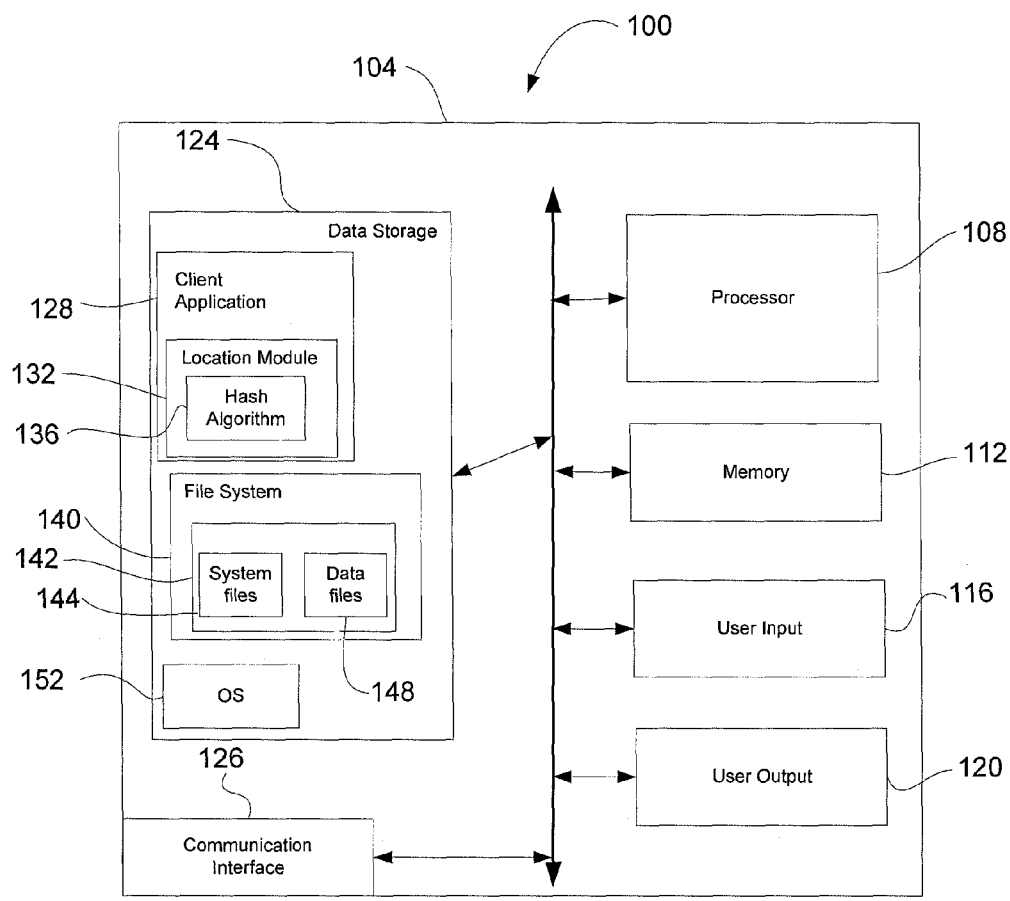
FIG. 1 depicts components of a system incorporating a secure file system in accordance with embodiments of the present invention.

FIG. 1 depicts components of a system 100 incorporating a secure file system in accordance with embodiments of the present invention. The system 100 can be implemented by or in connection with a computer 104. The computer 104 is not limited to any particular type or class of device. For example, as used herein, the computer 104 can include a general purpose computer, a personal computer, a server computer, a workstation, a dedicated data storage system or network attached storage system, a smart phone, tablet computer, a gaming system, an industrial control system, or any other device that contains or is associated with data stored as a set or collection of files in a file system. Moreover, the system 100 can, but need not, include a plurality of interconnected devices and integrated and/or external data storage systems.

A computer 104 implementing some or all of a system 100 in accordance with embodiments of the present invention generally includes a processor 108 and memory 112. In addition, the computer 104 can include one or more user input devices 116 and one or more user output devices 120. The computer 104 also generally includes data storage 124. In addition, a communication interface 126 can be provided, to facilitate interconnection of the computer 104 to other computers or devices, including external storage devices, directly or over a network.

The processor 108 may include any processor capable of performing or executing instructions encoded in software or firmware. In accordance with other embodiments of the present invention, the processor 108 may comprise a controller or application specific integrated circuit (ASIC) having or capable of performing instructions encoded in logic circuits. The memory 112 may be used to store programs and/or data, for example in connection with the execution of code or instructions by the processor 104. As examples, the memory 112 may comprise RAM, SDRAM, or other solid state memory. In general, a user input device 116 is included as part of the computer 104 that allows a user to input a password and other information, such as a user name. Examples of user inputs 116 that can be provided as part of a computer 104 include a keyboard, keypad, speaker, biometric input device, mouse or other position encoding device, or the like. A user output 120 can, for example, include a display, speaker, indicator lamp, or the like. The data storage 124 may generally include storage for programs and data. Like the memory 112, the data storage 124 may comprise a solid state device. Alternatively or in addition, the data storage 124 may comprise but is not limited to a hard disk drive, a tape drive, or other addressable storage device or set of devices. Moreover, the data storage 124 can be provided as an integral component of the computer 104, or as an interconnected data storage device or system. The data storage 124 may provide storage for a client application 128 that includes or implements a location module 132. The location module 132 generally operates to determine the location of files in data storage based on various inputs, and to perform other functions to obscure the locations and/or identity of significant system files as described herein. The location module 132 includes a hash algorithm 136 that is used in connection with the generation of file storage locations, and with accessing stored files. In addition, the data storage 112 may include storage for a file system 140. As described in greater detail elsewhere herein, the file system 140 includes a plurality of files 142 placed at locations determined by the operation of the location module 132. These files 142 can include system files 144 and data files 148. The data storage 124 can also store operating system software 152, and other applications or data.

Figure 2:
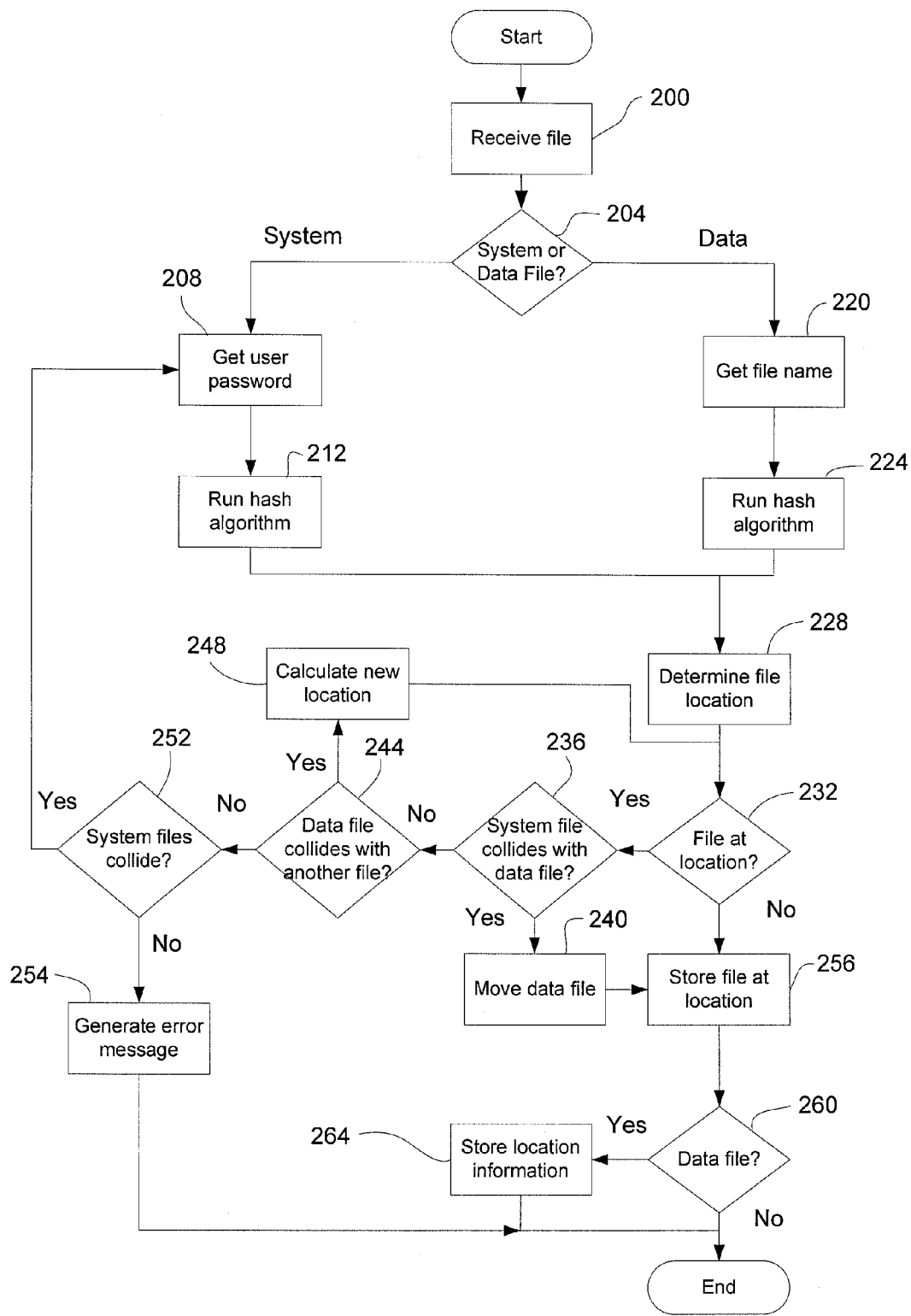
FIG. 2 depicts aspects of an exemplary file storage process in accordance with embodiments of the present invention.

FIG. 2 depicts aspects of the operation of a client application 128 incorporating a location module 132 in accordance with embodiments of the present invention. Initially, at step 200, a file 142 is received for placement in the file system 140 of the computer 104 running or associated with the client application 128. At step 204, a determination is made as to whether the received file 142 is a system or data file. If the file 142 is a system file 144, the client application 128 gets the user name and a secret input (step 208). As an example, the secret input can be a user password. Getting the user name and secret input can include providing a prompt that is displayed to the user through the user output 120 to request that the user provide the user name and secret input through the user input 116. If the user name and secret input have been entered previously, getting those items can include retrieving them from memory 112 and/or data storage 124. The user name and secret input are then provided to the hash algorithm 136, and the hash algorithm 136 is run, to determine the location at which the system file 144 will be placed within the file system 140 on the data storage 124 (step 212). In connection with the execution of the hash algorithm 136, a salt can be provided as an additional input. The salt can be maintained by the client application 128, and in particular by the location module 132. The resulting output from the hash algorithm 136 can then be used to determine the location at which the system file 144 will be placed.

If at step 204 the file 142 is determined to be a data file 148, the client application 128 and in particular the location module 132 operates to get the name of the data file 148 (step 220). The data file 148 name can be a name associated with the data file 148 upon the creation of that file 148. Alternatively, the name of the data file 148 can be assigned by the location module 132 of the client application 128, for example after the client application 128 has been tasked with storing the data file 148 in the file system 140. Accordingly, a homogenized naming convention, as described in greater detail elsewhere herein, can be applied by the location module 132. At step 224, the location module 132 provides the file name 220 to the hash algorithm 136, which is executed to obtain a value used to determine the file location. In connection with the execution of the hash algorithm 136, a salt can be applied. The salt can be the same as or different than the salt used in connection with the determination of a system file 144 location.

As previously noted, the hash algorithm 136 of the location module 132 operates to generate values that are used to determine a location within the file system 140 in which to place a subject file 142. The value generated by execution of the hash algorithm 136 can be characterized as a random or pseudo-random value, which may require translation or transformation in order to be used as a location within the file system 140. Accordingly, at step 228, the location module 132 operates to determine the location within the file system 140 at which the file 142 will be placed, based on the output of the hash algorithm 136. As described in greater detail elsewhere herein, determining the file 142 location can include parsing a value generated by the hash algorithm 136, translating segments of the generated value, and/or the creation of directories and subdirectories within the file system 140.

At step 232, a determination is made as to whether a file, such as a previously stored system file 144 or data file 148, already occupies the determined file location. If another file already occupies the determined location, then measures are taken to place the file 142 in an appropriate location. For example, if it is determined that a system file 144 is being stored and the collision is with a data file 148 (step 236), the data file 148 is moved (step 240) and the system file 144 is stored at the determined location. Alternatively, if it is determined that the file being stored is a data file 148 and there is a collision with a previously stored file 142 (step 244), a collision algorithm can be applied to calculate a new location (step 248). As yet another alternative, if at step 252 the file being stored is determined to be a received system file 144, and another system file 144 is already in the determined location, the process can return to step 208 where the user is prompted for additional input so that a new location can be calculated. In particular, recalculation can include prompting the user to provide other secret input or data. If at step 252 a collision between a received system file 144 and another system file 144 is not detected, a system error signal is indicated (step 254).

If the determined location for the file 142 is not already occupied, the file 142 is stored at the determined location within the file system 140 (step 256). After storing the file 142 at any one of steps 240, 248 or 256, a determination is made as to whether the subject file is a data file 148 (step 260). If the subject file is a data file 148, information regarding the location of that data file 148 is stored in the applicable system index (step 264). If the subject file is a system file 144, the location of that system file 144 is not stored. Instead, the location of the system file 144, which for example can include a file system 140 index containing the locations of data files 148, is generated from provided user name and password information each time the system file 144 is retrieved from data storage 124.

Figure 3:
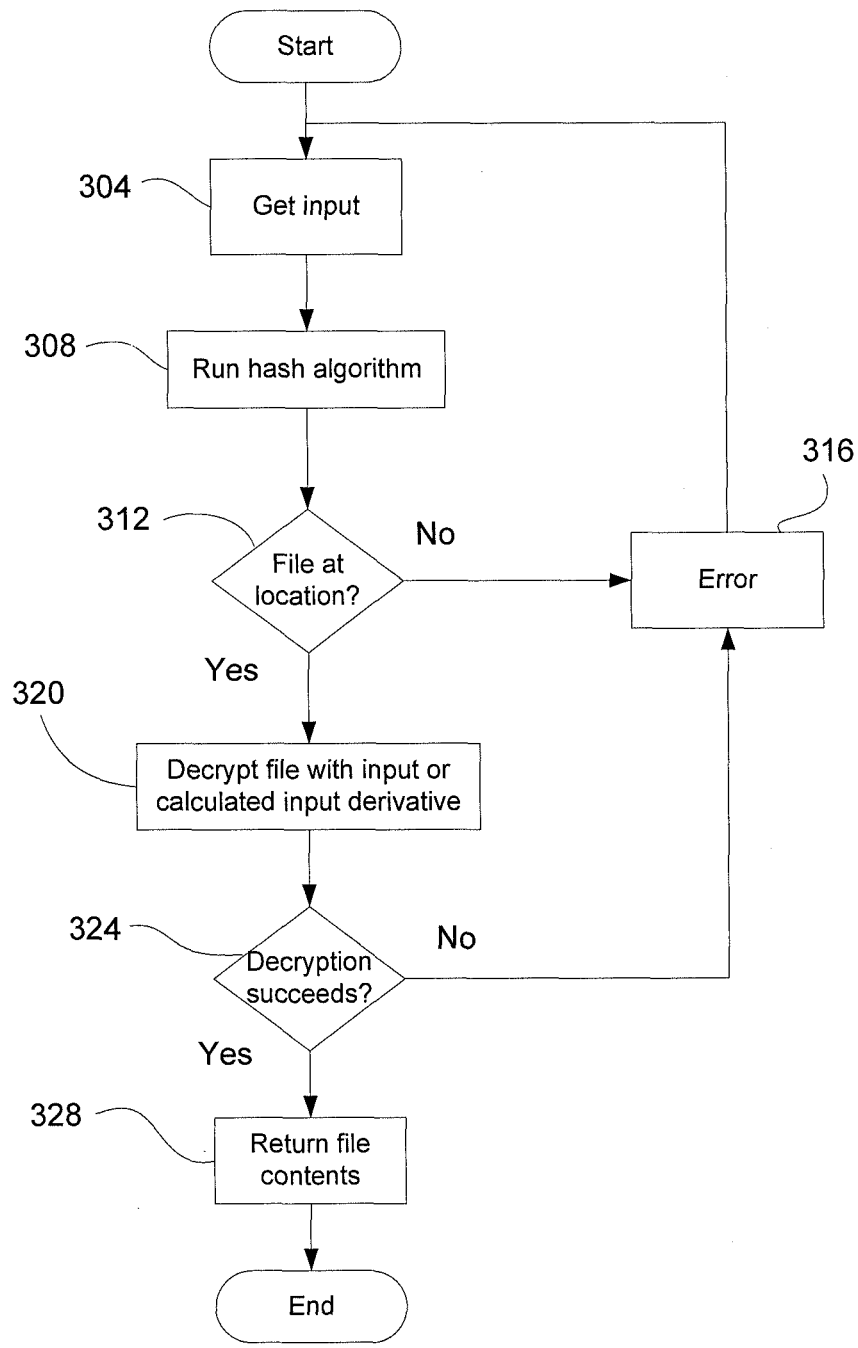
FIG. 3 depicts aspects of an exemplary system file retrieval process in accordance with embodiments of the present invention.

FIG. 3 illustrates aspects of an exemplary system file 144 retrieval process in accordance with embodiments of the present invention. In particular, at step 304, the client application 128 gets required user input. This required input can include the user name and secret input or data associated with the file system 140 that is being accessed. The hash algorithm 136 is then executed to generate the location of the system file 144 (step 308). As can be appreciated by one of skill in the art after consideration of the present disclosure, the generation of a system file 144 location by the hash algorithm 136 requires that the same user name and secret input, and salt (if any) that were used to originally determine the system file 144 location be provided as part of the retrieval process.

At step 312, a determination is made as to whether the system file 144 is at the determined location. If the file is not at that location, an error is indicated (step 316), and the process returns to step 304. If the system file 144 is found at the determined location, that system file 144 can be decrypted using the provided input or a calculated input derivative (step 320). Accordingly, some or all of the user input that was used to determine the location at which the system file 144 is stored can be used to decrypt the system file 144. At step 324, a determination is made as to whether decryption of the system file 144 has succeeded. If decryption did not succeed, an error is declared (step 316), and the process returns to step 304. If the decryption has succeeded, the system file 144 contents are returned to the client application 128 (step 328). For example, where the system file 144 comprises a system index, the client application 128 can retrieve information regarding the location of data files 148 within the file system 140 once the system file 144 has been decrypted and its contents provided or made available to the client application 128.

Figure 4:
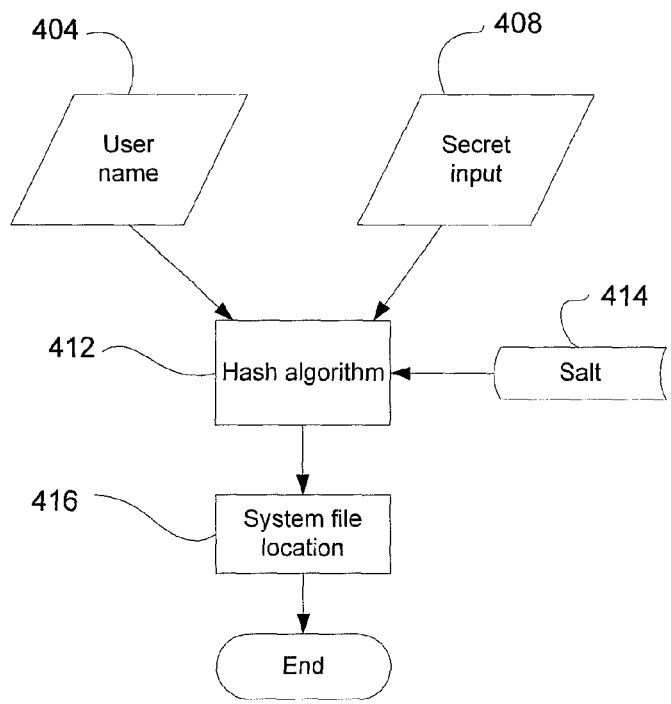
FIG. 4 illustrates features of a system file location process in accordance with embodiments of the present invention.

FIG. 4 illustrates features of the determination of a system file 144 location in accordance with embodiments of the present invention. In particular, FIG. 4 shows the provision of user inputs, including the user name 404 and secret input or data 408, to the hash algorithm 136 (step 412). The hash algorithm 136 can also receive a salt 414. The salt 414 can vary, for example depending on the identity of the system file 144 that is being located. For instance, a first salt 414 can be applied for the storage of a system index, while a second salt 414 can be applied for the location of an alternate system index or a key store. The hash algorithm 136 is executed at step 412, using the provided inputs 404, 408 and 416, to produce the system file location (step 416). The system file 144 location can be obtained directly from the output of the hash algorithm 412, or through a transformation of the hash algorithm 136 output. The process for locating a system file 144 illustrated in FIG. 4 can be followed whether the system file 144 is being stored, or is being accessed. In addition, the location of the system file 144 is changed each time the inputs, for example the user name 404 and/or secret data 408, are changed.

Figure 5:
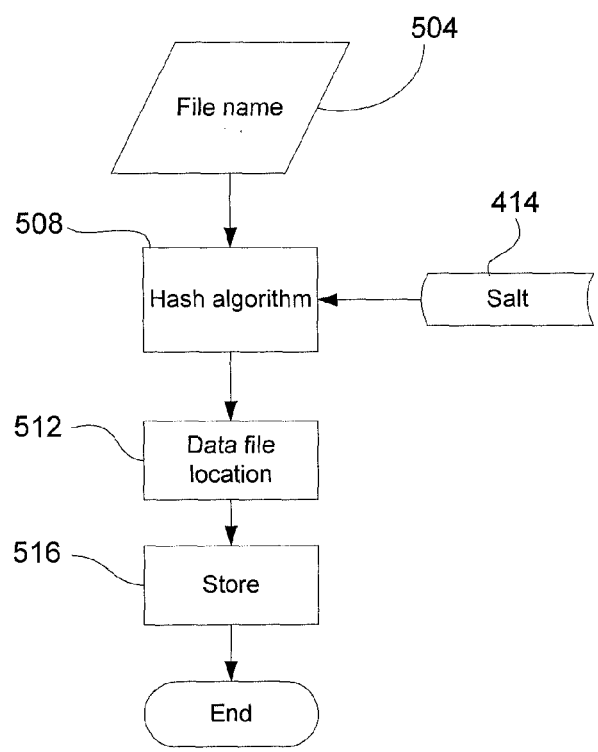
FIG. 5 depicts aspects of a data file location process in accordance with embodiments of the present invention.

FIG. 5 illustrates aspects of the determination of a data file 148 location in accordance with embodiments of the present invention. Initially, the name of the data file 148 is obtained (step 504). The name of the data file can be a name that is assigned to that file 148 by the location module 132 of the client application 128. Alternatively, the name can be a name assigned to that data file 148 by another system or application. That file name and optionally a salt 414 are provided to the hash algorithm 136, which operates to generate an output (step 508). That output is then applied to determine the location of the data file 148 (step 512). The location can be derived directly from the output of the hash algorithm 136, or can be some transformation of the hash algorithm 136 output that is performed by the location module 132. At step 516, the location of the data file 148 is stored in the appropriate system index. Accordingly, a data file 148 that has been stored in the file system 140 is accessed by first obtaining the location of that data file 148 from the appropriate system file 144 (i.e., the system index). As a result, different salts 414 can be applied to different data files 148. Moreover, neither the location module 132 nor the file system 140 is required to track or record the particular salt 414 used in connection with the storage of a particular data file 148.

Figure 6:
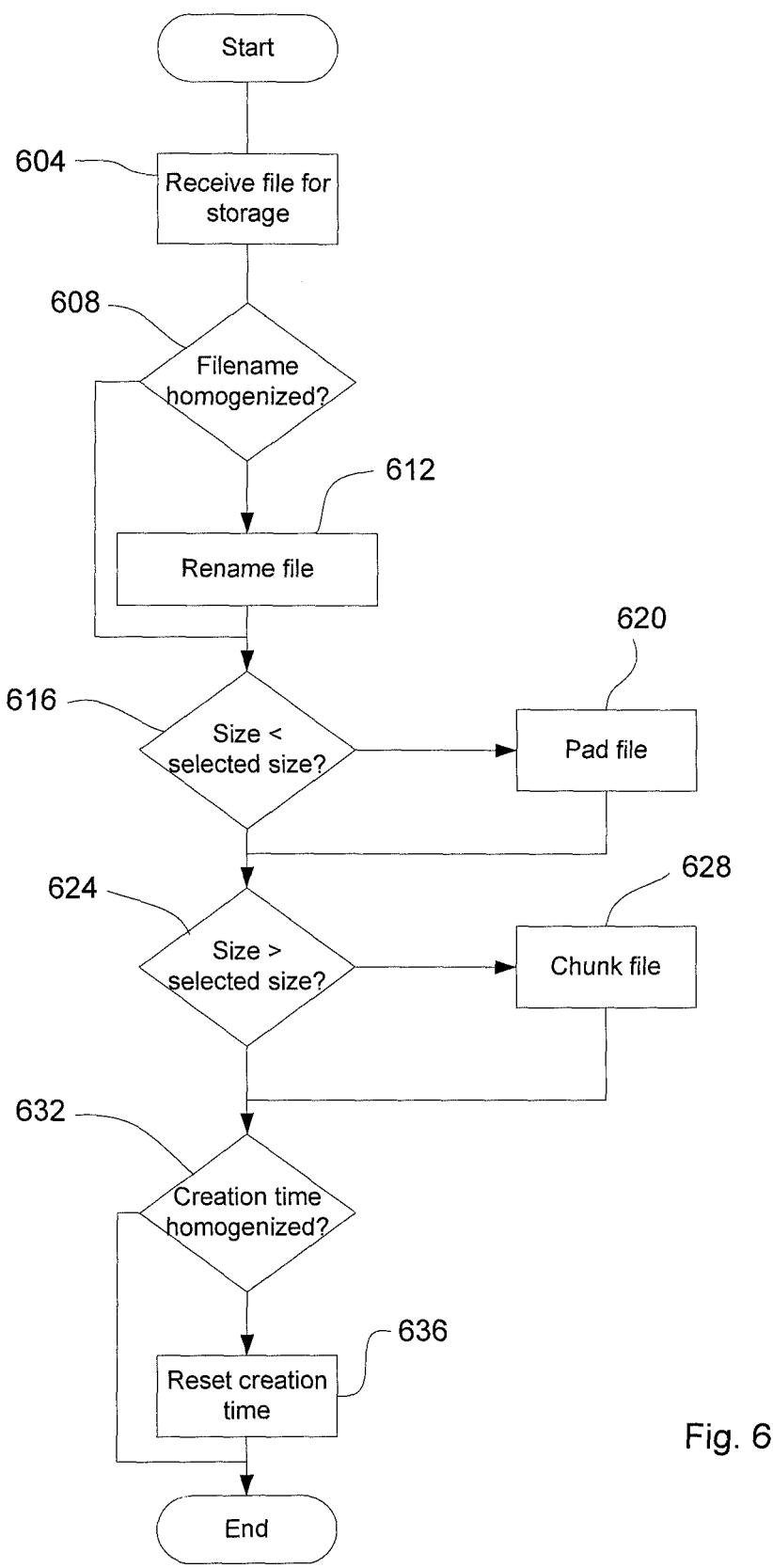
FIG. 6 illustrates other exemplary file obfuscation features in accordance with embodiments of the present invention.

FIG. 6 illustrates a process for implementing other file obfuscation features of a system 100 in accordance with embodiments of the present invention. In particular, these features can include the homogenization or the normalization of the names of files 142, the homogenization or the normalization of file 142 sizes, and the homogenization or normalization of creation times associated with files 142. These procedures can be initiated upon the receipt of a file 142 for storage in the file system 140 (step 604). At step 608, a determination may be made as to whether the file name has been normalized or otherwise conforms to a homogenized naming convention implemented by the location module 132 of the client application 128. If the file name has not been normalized, the file 142 is renamed (step 612). Renaming can include assigning a random, pseudorandom, or otherwise indistinct name to the file 142. As an example, and without limitation, the location module 132 can obfuscate the identity of individual files 142 by assigning file and folder or directory names that consist of platform independent characters. For instance, the letters A through Z and the numbers 0 through 9. Moreover, the file and folder names can be limited to some specified number of characters, for example two. Limiting the number of characters in the file name can also be beneficial in complying with the suggested limitations of certain operating systems 152 regarding the maximum number of files in a folder or directory. Where the potential number of files would exceed the number of files available through the use of file names having a maximum of two characters, nested files or directories can be used, such that the total number of files 142 within the file system 140 is not limited by the naming convention. Moreover, the characters assigned to an individual file 142 in order to name that file 142 can be selected randomly or pseudorandomly. In addition, file names can be case insensitive. The result of applying some or all of the measures is a file system 140 with a collection of files 142 with relatively indistinct, homogenized names.

At step 616, a determination can be made as to whether the file 142 size is less than a selected size. If the size of the file 142 is less than the selected size, the file 142 can be padded to bring the file size to at or near the selected size (step 620). At step 624, a determination may be made as to whether the size of the file 142 is greater than a selected size. If the size is greater than the selected size, the file 142 can be chunked or broken into a plurality of smaller files 142 (step 628). Chunking a file 142 can include padding the size of a remainder file that is smaller than a selected size. As used herein, a selected size can be a predetermined file size. Alternatively, the selected size can be determined from an average size of files in the file system 140. In accordance with still other embodiments, the selected size can be determined based at least in part on the limitations of the device 104 on or in connection with which the file system 140 is implemented. Such limitations can include operating system 152 limitations, and data storage 124 limitations or requirements. In addition, the selected size to which a file 142 is padded or chunked can comprise a range of sizes, and a different selected size can be used in connection with a padding determination than is used in connection with a chunking determination. Accordingly, the files 142 within the file system 140 can have sizes that fall within some range. The result is that information regarding the amount of content actually contained by any one file 142 is obscured, making it impossible or more difficult for a hacker to identify files 142 that may be of particular interest.

At step 632, a determination may be made as to whether the creation time of a file 142 has been homogenized. If the creation time has not been homogenized, the creation time can be reset (step 636). For example, the creation time of files 142 as shown in a directory can be manipulated, either directly or by resaving the file 142. For instance, all of the files 142 in a file system 140 can be periodically reset. As another example, the indicated creation date of files 142 in the file system 140 can be reset to or about the date and time at which a most recent file 142 was saved to the file system 140. By thus homogenizing the creation time of files 142 and the file system 140, information that might be used by a hacker to identify critical system files is further obscured.

Figure 7:
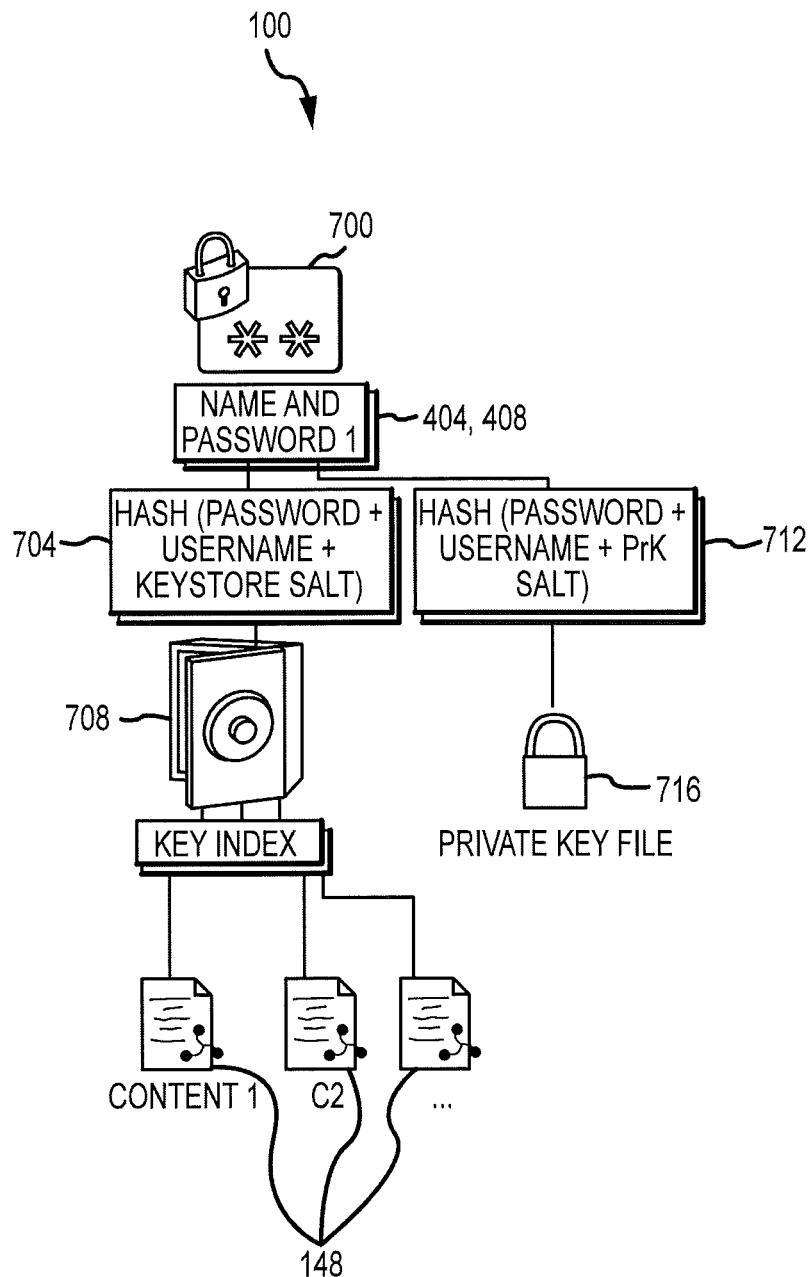
FIG. 7 depicts features of a file system in accordance with embodiments of the present invention.

FIG. 7 depicts aspects of an implementation of a system 100 in accordance with embodiments of the present invention that includes a single secured data subsystem 700. According to this exemplary implementation, upon the input of a user name and secret data 404 and 408, system files 144 including a key index 708 and a private key file 716 are located. More particularly, in one operation 704 the hash algorithm 136 applies a first salt 414 to the user name and password 404 and 408 to determine the location of a system file 144 comprising a key index 708. The key index 708 generally includes index information regarding the location of items of content or data files 148. In another operation 712, the hash algorithm 136 applies the user name and password 404 and 408 and a second or private key salt 414 to determine the location of a system file 144 comprising a private key file 716. The private key file 716 can function as a store of keys required to access content or other data files 148. Therefore, from this example, it can be appreciated that the entry by a user of one set of information can be used by the location module 132 to point to multiple system files 144.

Figure 8:
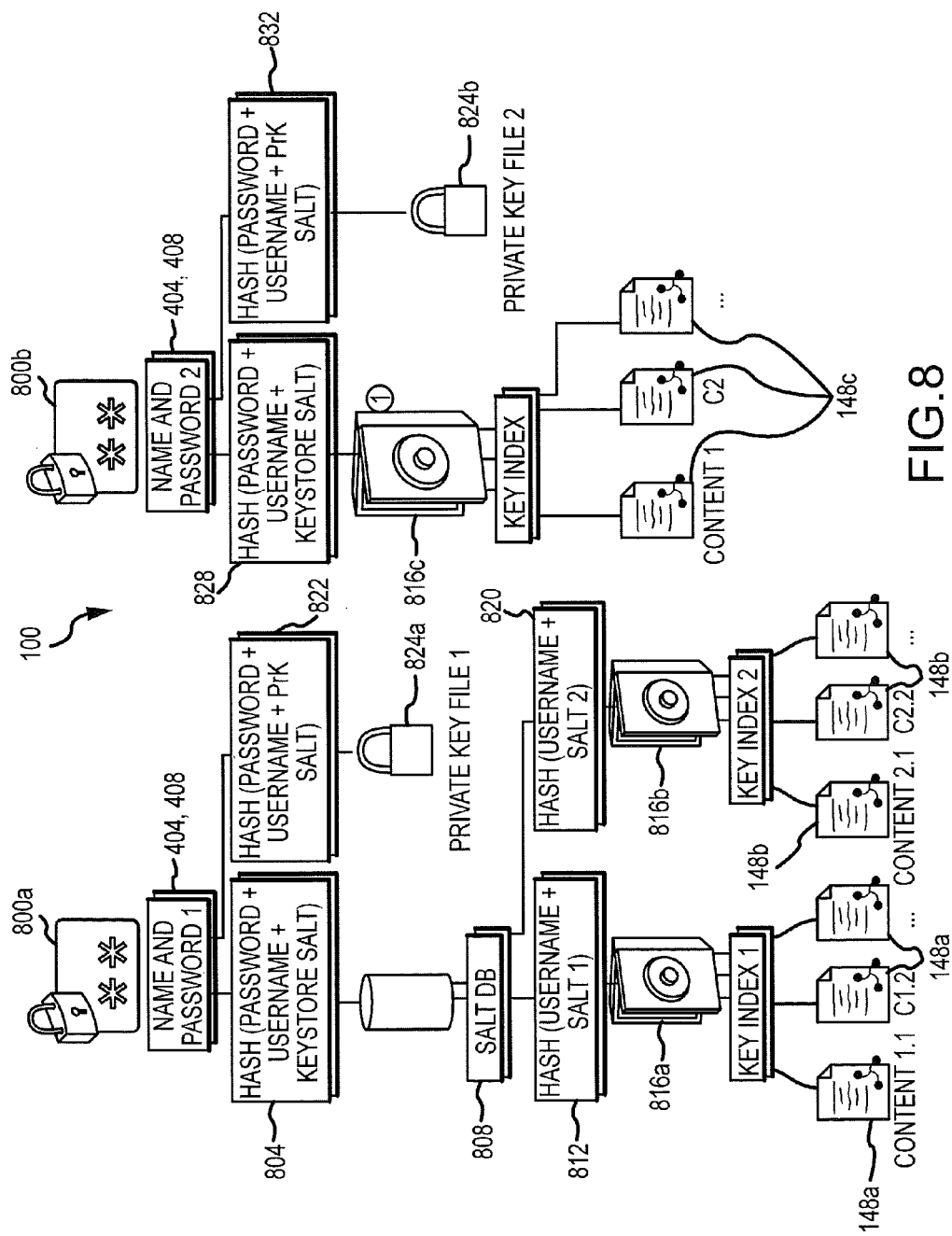
FIG. 8 depicts features of another exemplary file system in accordance with embodiments of the present invention.

FIG. 8 depicts aspects of another exemplary system 100 in accordance with embodiments of the present invention that includes first 800*a* and second 800*b* secured data subsystems. In this system 100, a first user name 404 and a first secret input (in this example a first password) 408 are provided to the location module 132 for processing by the hash algorithm 136 in connection with the first data subsystem 800*a*. In a first operation 804 the hash algorithm 136 uses the user name 404 and password 408, and a first key store salt 414 to point to a first system file 144 comprising a salt database 808. After thus gaining access to the salt database 808, a first key index salt 414 and the user name 404 are provided by the location module 132 to the hash algorithm 136 in a second operation 812 to obtain the location of and access to a second system file 144 comprising a first key index 816*a*. The first key index 816*a* can provide index information required to access a first set of content or data files 148*a*. A second salt 414 from the salt database 808 can be provided to the hash algorithm 136, together with the user name 404, in a third operation 820 to determine the location of and gain access to another system file 144 comprising a second key index 816*b*. The second key index 816*b* can include index information required to access a second set of content or data files 148*b*. The first user name 404 and first password 408 can also be combined with a private key salt 414 and provided by the location module 132 to the hash algorithm in a fourth operation 822 to determine a location of and to gain access to a first private key file 824*a*. The first private key file 824*a* can contain the private keys necessary to access content 148*a* and 148*b* indexed as part of the first 816*a* or second 816*b* key indices.

In addition, the first user name 404 can be provided in combination with a second secret input (in this example a second password) 408 to the hash algorithm 136 by the location module 132 in connection with establishing and accessing the second data subsystem 800*b*. For example, the first user name 404 and a second password 408, together with the first salt 414, can be provided to the hash algorithm 132 in a fifth operation 828 to determine the location of and to gain access to a third key index 816*c*. The third key index 816*c* can include index information required to access an associated set of content or data files 148*c*. Moreover, the set of content or data files 148*c* accessed through the third key index 816*c* can be entirely independent of the sets of content 148*a* and 148*b* associated with the first and second 816*a* and 816*b* key indices. In fact, the only commonality in this example is that a first user name 404 is used to access and locate both data subsystems 800*a* and 800*b*, and both data subsystems 800*a* and 800*b* are associated with the same client application 128. The first user name 404 and the second password 408 can be combined with the private key salt 414 in a sixth operation 832 to determine a location of and to access a second private key file 824*b* that, for example, contains the private keys necessary to access data files 148*c* indexed by the third key index 816*c*.

Figure 9:
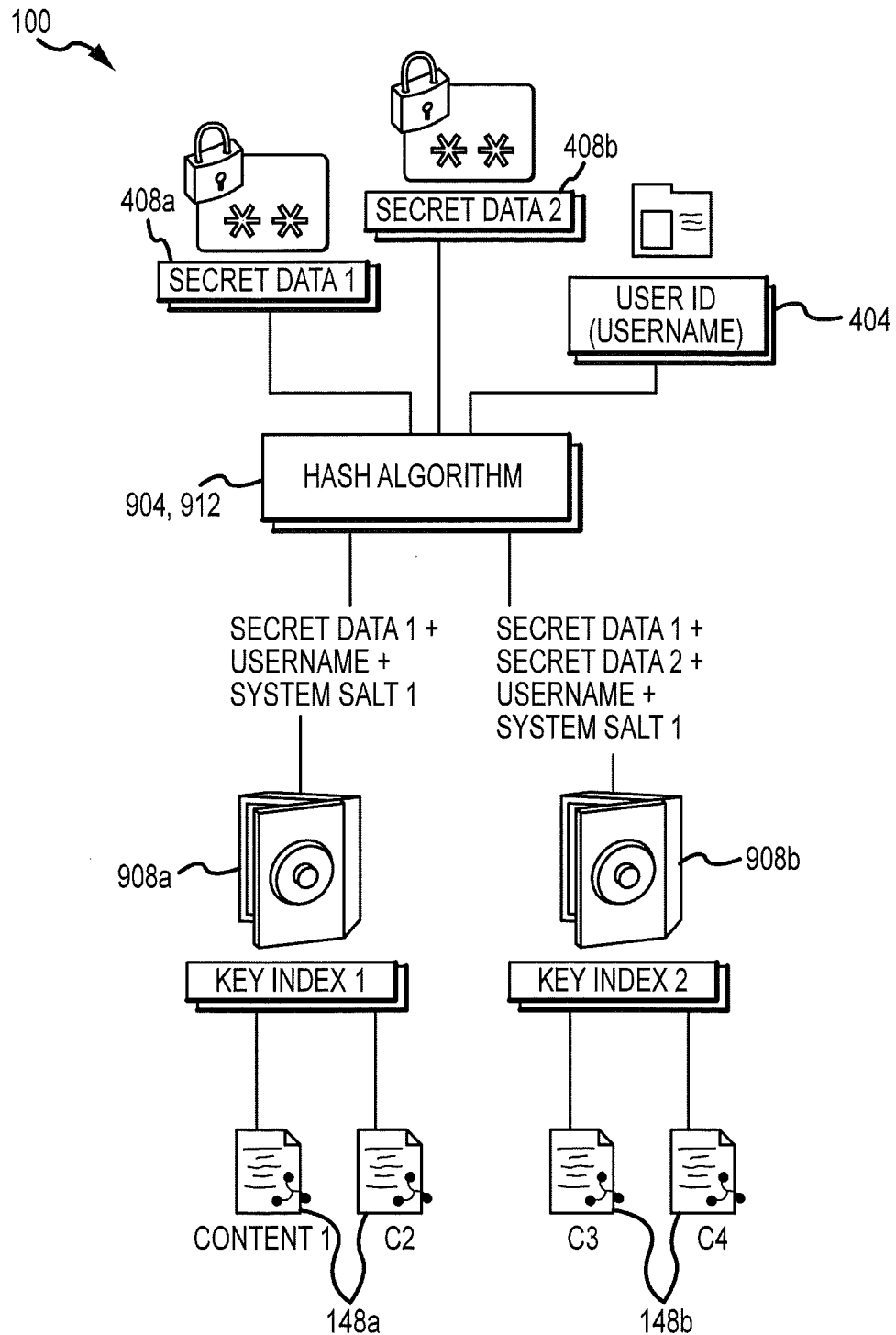
FIG. 9 depicts features of another exemplary file system in accordance with embodiments of the present invention.

FIG. 9 depicts aspects of another exemplary system 100 in accordance with embodiments of the present invention. In this system 100, a first user name 404 can be combined with first and/or second secret inputs 408*a* and 408*b* to access different data sets. For example, by combining the user name 404, a first item of secret data 408*a*, and a first salt 414 using the hash algorithm 132 at step 904, a first key index 908*a* can be located and accessed. The first key index 908*a* can point to a first set of content 148*a*.

In a further aspect, by providing the user name 404, the first secret input 408*a*, the second secret input 408*b*, and the first salt 414 to the hash algorithm 132 in a second step 912, a second key index 908*b* can be located and accessed. The second key index 908*b* can point to a second set of content 148*b*. Accordingly, by providing additional secret inputs 408, different locations can be produced and accessed within the file system 140. Moreover, embodiments of the present invention can require that alternate or additional secret inputs 408 be entered in a specific sequence in order to produce a particular hash location. For example, if multiple secret inputs 408 required to access a particular hash location are entered in the incorrect sequence, the first system file will not be located.

FIG. 10 illustrates the contents of an exemplary file system 140 in accordance with embodiments of the present invention. As shown, the file system 140 can contain a plurality of files 142 either in a root directory 1004 or in one or more subdirectories 1008*a* or 1008*b* established in the data storage 124. Moreover, these files 142 can comprise system files 144 and 148, without any obvious distinction between those types of files 142. The directory 1004 or subdirectory 1008*a* or 1008*b* in which a particular file 142 is placed is determined through operation of the location module 132 by application of input data to the hash algorithm 136. For example, if a file name of a data file 148 and a salt input to the hash algorithm result is the location module returning a value of "ACAFAG", the data file 148 is placed in directory AC, and subdirectory AF, and is renamed AG. A homogenized location and name can thus be generated in the same operation. Moreover, the structure of the file system 140 directories does not provide information that can be used by a hacker to locate significant files 142. In addition, the names of the directories 1004 and 1008*a* and 1008*b* and the files 142 are homogenized. In particular, although the subdirectories 1008*a* and 1008*b* and the files 142 have names and/or past names that allow them to be uniquely distinguished from one another, the naming convention that is applied, here the assignment of a two character name, does not provide information to a potential hacker as to the content of the files 142. Likewise, in the column of size information 1012, the file sizes have been homogenized such that they all fall within a selected range. Again, information that could be used by a hacker to distinguish files of significance to the security of the system from other files is obscured. Similarly, the date 1016 associated with each file 142 has been homogenized, to remove information that may be used by a hacker to identify significant system files 144.

A system 100 in accordance with embodiments of the present invention can also include features to lock associated files 142 to the computer 104. According to such an embodiment, a device identifier (ID) associated with the computer 104 is used as part of the input provided to the hash algorithm 136. As a result, any other device ID will not produce the same hash algorithm 136 output, even if the other inputs to the hash algorithm 136 are the same.

The description of the system 100 contained herein provides as examples certain arrangements and embodiments of the disclosed secure file system. However, embodiments of the invention are not limited to those specifically illustrated. For example, as can be appreciated by one of skill in the art, other physical arrangements of system 100 components can be employed in connection with providing a secured file system 140 as disclosed herein. In addition, while the description has included examples of a secure file system 140 implemented on a device or computer 104, a secure file system 140 may be implemented in connection with a distributed system. For example, embodiments of the present invention can include variations in which the data storage 124 is provided by the cloud or by specific network connected data storage 124. Moreover, data storage 124 can include multiple storage devices, for example configured as a RAID system or other coordinated set of storage devices 124.

In addition, certain exemplary applications and modules, such as a client application 128, location module 132 and hash algorithm 136 have been illustrated and described. As can be appreciated by one of skill in the art after consideration of the present disclosure, such components or modules and their relation to one another can be modified. In particular, while the description of such components is believed to facilitate an understanding of the system 100 and its operation, a system 100 or process in accordance with embodiments of the present invention is not necessarily required to include components and modules that are segmented as described in the provided examples.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for storing files, comprising:
   receiving by a first client application at least first and second identifiers;
   providing the first and second identifiers to a hash algorithm, wherein the hash algorithm produces a first output;
   using the first output to determine a first file system location;
   storing a first index file in data storage at the first file system location;
   assigning a first filename to a first data file;
   providing the first filename as a third identifier to the hash algorithm, wherein the third identifier is different than the first identifier and the second identifier, and wherein the hash algorithm produces a second output;
   using the second output to determine a second file system location;
   storing the first data file in the data storage at the second file system location;
   storing the second file system location in the first index file;
   receiving at the first client application a request to access the first data file;
   prompting by the first client application entry by a user of at least one of the first and second identifiers, wherein the user is prompted to enter the at least one of the first and second identifiers after the first output has been produced;
   in response to the prompt, the user entering the at least one of the first and second identifiers;
   receiving by the first client application the at least one of the first and second identifiers, wherein the at least one of the first and second identifiers are provided to the hash algorithm to reproduce the first output and to determine the first file system location;
   accessing the first index file stored in the data storage at the first file system location and retrieving from the first index file the second file system location;
   assigning a second filename to a second data file, wherein the first filename has a first character length, and wherein the second filename has the first character length;
   determining a size of the first data file, wherein in response to the size of the first data file having less than a first predetermined size the first data file is padded to have a first normalized size, and wherein the padded first data file is stored.

2. The method of claim 1, wherein the first identifier is a user name and wherein the second identifier is a password.

3. The method of claim 1, further comprising:
   a first salt, wherein the first salt is input to the hash algorithm with the first identifier and the second identifier to produce the first output that is used to determine the first file system location.

4. The method of claim 3, further comprising:
   a second salt, wherein the second salt is input to the hash algorithm with the third identifier, wherein the hash algorithm produces the second output that is used to determine the second file system location.

5. The method of claim 3, further comprising:
   a second salt, wherein the second salt is input to the hash algorithm with the first identifier and the second identifier, wherein the hash algorithm produces the second output that is used to determine the second file system location;
   storing a second file in the data storage at the second file system location.

6. The method of claim 5, wherein the second file is a key store.

7. The method of claim 1, further comprising:
   receiving by the first client application a fourth identifier;
   providing the first identifier and the fourth identifier to the hash algorithm to produce a third output;
   using the third output to determine a third file system location.

8. The method of claim 1, further comprising:
   receiving by the first client application a fourth identifier;
   providing the first identifier and the fourth identifier to the hash algorithm to produce a third output;
   using the third output to determine a third file system location;
   accessing an executable file stored in the data storage at the third file system location;
   executing the executable file.

9. The method of claim 1, further comprising:
   providing at least a fourth identifier to the hash algorithm, wherein the hash algorithm produces a third output;
   using the third output to determine a third file system location;
   storing a second file in the data storage at the third file system location.

10. The method of claim 9, wherein the third file stored in the second file system location is a second index file associated with a second data set.

11. The method of claim 1, further comprising:
    providing the second file name as a fourth identifier to the hash algorithm, wherein the hash algorithm produces a third output;
    using the third output to determine a third file system location;
    storing the second data file in the data storage at the third file system location;
    storing the third file system location in the first index file.

12. A method for storing files, comprising:
    providing data storage;
    providing a processor;
    providing a client application that is executable by the processor, wherein the client application includes a file system module;
    prompting a user for a password;
    receiving a first password at the client application;
    providing at least the received first password and a first salt as a first input to a hash algorithm;
    in response to the first input, generating by the hash algorithm a first output;
    transforming the first output to a first file system location;
    storing a first index file at the first file system location in the data storage;
    providing at least the received first password and a second salt as a second input to the hash algorithm;
    in response to the second input, generating by the hash algorithm a second output;
    transforming the second output to a second file system location;
    storing a first key store file at the second file system location in the data storage;

receiving a first data file, wherein the first data file is associated with a first name, wherein the first name has a first character length;
assigning a second name to a second data file, wherein the second name has the first character length;
determining a size of the first data file, wherein in response to the size of the first data file having less than a first predetermined size the first data file is padded to have a first normalized size, and wherein the padded first data file is stored.

13. The method of claim 12, further comprising:
providing at least the first name and the second salt as a third input to the hash algorithm;
in response to the third input, generating by the hash algorithm a third output;
transforming the third output to a third file system location;
storing the first data file at the third file system location in the data storage;
storing a record of the third file system location in the first index file;
placing a key associated with the first data file in the first key store file.

14. The method of claim 13, further comprising:
receiving a second password at the client application;
providing at least the received second password and the first salt as a fourth input to the hash algorithm;
in response to the fourth input, generating by the hash algorithm a fourth output;
transforming the fourth output to a fourth file system location;
storing a second index file at the fourth file system location in the data storage.

15. A system, comprising:
data storage device;
a client application, wherein the client application is stored in the data storage device, and wherein the client application includes a hash algorithm;
a user input, wherein in response to receiving at least a first input at the user input the client application is operable to generate a first value using the hash algorithm, wherein the first value is used to determine a first location in the data storage device for storing a system index file, wherein the system index file is stored at the first location in the data storage device, and wherein a record of the first location is not stored in the data storage device, wherein in response to the client application receiving a request to store a data file in the data storage device the client application is operable to generate a second value using a first filename of the data file as a second input to the hash algorithm, wherein the second value is used to determine a second location in the data storage device for storing the data file, wherein the data file is placed in the data storage device at the second location, and wherein the second location is stored in the system index file, wherein a second data file has a second filename, wherein the first filename has a first character length, wherein the second filename has the first character length, wherein in response to the client application determining a size of the data file is less than a first predetermined size the client application is operable to pad the data file to have a first normalized size, and wherein the padded data file is stored.

* * * * *